(12) United States Patent
Hernandez Creus et al.

(10) Patent No.: US 10,035,363 B2
(45) Date of Patent: *Jul. 31, 2018

(54) LOCATING A TARGET THROUGH MEDIA

(71) Applicant: HEWLETT-PACKARD DEVELOPMENT COMPANY, Houston, TX (US)

(72) Inventors: Jordi Hernandez Creus, Sant Cugat del Valles (ES); Yngvar Rossow Sethne, Sant Cugat del Valles (ES); Josep M. Aymerich i Bolta, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/630,663

(22) Filed: Jun. 22, 2017

(65) Prior Publication Data

US 2017/0282600 A1  Oct. 5, 2017

Related U.S. Application Data

(63) Continuation of application No. 15/124,614, filed as application No. PCT/US2014/031932 on Mar. 27, 2014, now Pat. No. 9,718,288.

(51) Int. Cl.
*B41J 3/60* (2006.01)
*B41J 11/46* (2006.01)
*B41J 29/393* (2006.01)
*B41J 11/00* (2006.01)
*G06K 15/02* (2006.01)
*G06K 15/10* (2006.01)

(52) U.S. Cl.
CPC .............. *B41J 11/46* (2013.01); *B41J 3/60* (2013.01); *B41J 11/0095* (2013.01); *B41J 29/393* (2013.01); *G06K 15/021* (2013.01); *G06K 15/105* (2013.01); *G06K 2215/0094* (2013.01); *G06K 2215/101* (2013.01)

(58) Field of Classification Search
CPC ........ B41J 3/60; B41J 11/0095; B41J 29/393; B41J 11/46; G06K 15/021; G06K 15/105
See application file for complete search history.

(56) References Cited

U.S. PATENT DOCUMENTS 7,262,786 B2   8/2007  Kang et al.
7,283,660 B2  10/2007  Ganot et al.
7,552,995 B2   6/2009  Nakazawa et al.
(Continued)

FOREIGN PATENT DOCUMENTS

CN       1939749     4/2007
CN     101027612    8/2007
(Continued)

OTHER PUBLICATIONS

Double-Sided Printing (Research Paper); Dec. 13, 2011; 6 Pages. http://www.regionalsupply.com/customer/resusa/customerpages/specpages/productc%20information%20sheets/HP/HP%20Latex%20Double-sided%20Printing.pdf.

*Primary Examiner* — Lamson Nguyen
(74) *Attorney, Agent, or Firm* — HP Inc. Patent Department

(57) ABSTRACT

A printer is disclosed. The printer uses a target located on one side of media to position an image on the other side of the media. The printer backlights the media and uses a sensor that locates the target through the backlit media.

20 Claims, 7 Drawing Sheets

(56) References Cited

U.S. PATENT DOCUMENTS

| | | |
|---|---|---|
| 7,870,824 B2 | 1/2011 | Helma et al. |
| 7,949,294 B2 | 5/2011 | Nagata |
| 8,390,857 B2 | 3/2013 | Igarashi |
| 8,444,135 B2 | 5/2013 | Morita |
| 9,718,288 B2 * | 8/2017 | Hernandez Creus .................. B41J 11/0095 |
| 2007/0211094 A1 | 9/2007 | Roth et al. |
| 2009/0067911 A1 | 3/2009 | Matsuhashi |
| 2009/0293750 A1 | 12/2009 | Haenni et al. |
| 2013/0293613 A1 | 11/2013 | Berel |

FOREIGN PATENT DOCUMENTS

| | | |
|---|---|---|
| CN | 101194498 | 6/2008 |
| CN | 102729646 | 10/2012 |
| CN | 103376476 | 10/2013 |
| EP | 2357087 | 8/2011 |
| JP | 2006-181931 | 7/2006 |
| JP | 2009528934 | 8/2009 |
| JP | 2010137565 | 6/2010 |
| JP | 2012206265 | 10/2012 |
| JP | 2013018277 | 1/2013 |

* cited by examiner

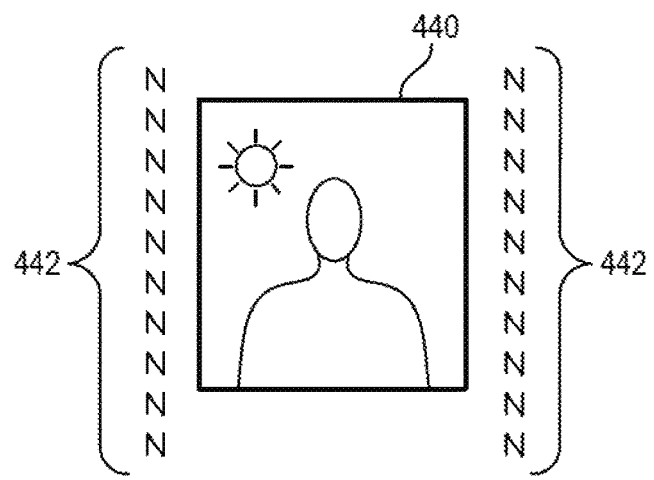
*Fig. 4A*
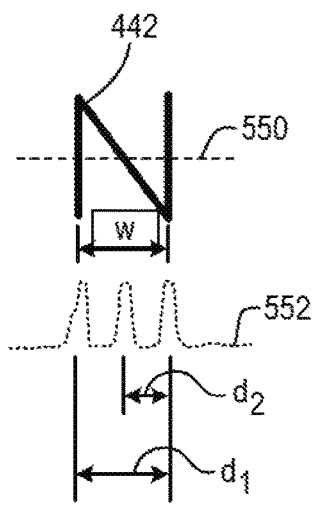
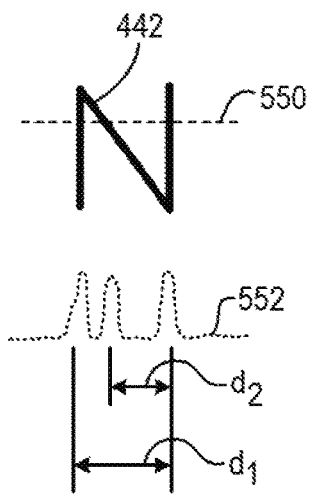
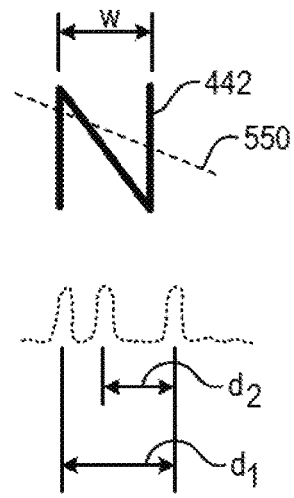
*Fig. 4B*  *Fig. 4C*  *Fig. 4D*

LOCATING A TARGET THROUGH MEDIA

BACKGROUND

Some signs or billboards are designed to be viewed both during the day and during the night. During the day the illumination for the sign is typically daylight reflecting off the front surface of the sign. At night the signs are illuminated with a light source. Some signs are illuminated with a light source that mimics daylight by directing light towards the front surface of the sign. Other signs are backlit with a light source that is behind the sign that directs light through the sign.

Backlit signs may have an image printed on the front side of the sign and a mirrored copy of the image printed on the back side of the sign. When viewed during the day the front image is seen. When viewed at night the final image seen is a combination of the image printed on the back side of the sign and the image printed on the front side of the sign. The image printed on the back side of the sign may be less saturated than the image printed on the front side. By printing a less saturated copy of the image on the back side the combined image seen at night can be color matched to the front side image when viewed during the day.

BRIEF DESCRIPTION OF THE DRAWINGS

FIG. 4A is an example of the printing on side A.
FIG. 4B is an example target being scanned.
FIG. 4C is an example target being scanned,
FIG. 4D is an example target being scanned.

DETAILED DESCRIPTION

Signs or billboards that are used both during the day and at night are known as "day and night" signs or "D&N" signs. When printing on media for a D&N sign, the same image is printed on the front side and the back side of the media with the back image a mirrored copy of the front side image. When the image printed on the front side is not aligned with the image printed on the back side the combined image viewed at night may have quality issues, for example it may have blurred edges or other visual defects.

Aligning the two images may be difficult. Currently the two images are manually aligned. A mark or target is printed along with the image on one side of the media. The position of the mark is measured in the X and Y direction with respect to a feature on the media, for example an edge. The measured distances are input as an offsets when printing the image on the second side of the media. This method has a number of problems. One problem is that the measurements are typically done by hand and are prone to errors. Another problem is that the edges of the media may not be aligned to the printer in the same way after the media has been flipped over when printing on the second side. Another reason that creates difficulty is that the media used for D&N printing is typically between 50% and 95% opaque, for example 90% opaque.

In one example a printer will print an image of one or more targets on the first side of the D&N media. The media will be flipped over and a mirrored copy of the first image will be printed on the second side of the media. The mirrored copy of the image printed on the second side will be aligned to the image on the first side using the targets printed on the first side. The printer will locate the targets using a sensor that looks through the media to locate the targets on the first side when the second side is being printed. The sensor will be able to locate the targets through the media because a media path runs between the sensor and a light source. Because the media is between the light source and the sensor the light source backlights the media allowing the sensor to locate the targets. Once the second side has been printed the targets are typically trimmed off, leaving only the images printed on both sides of the media.

Figure 1:
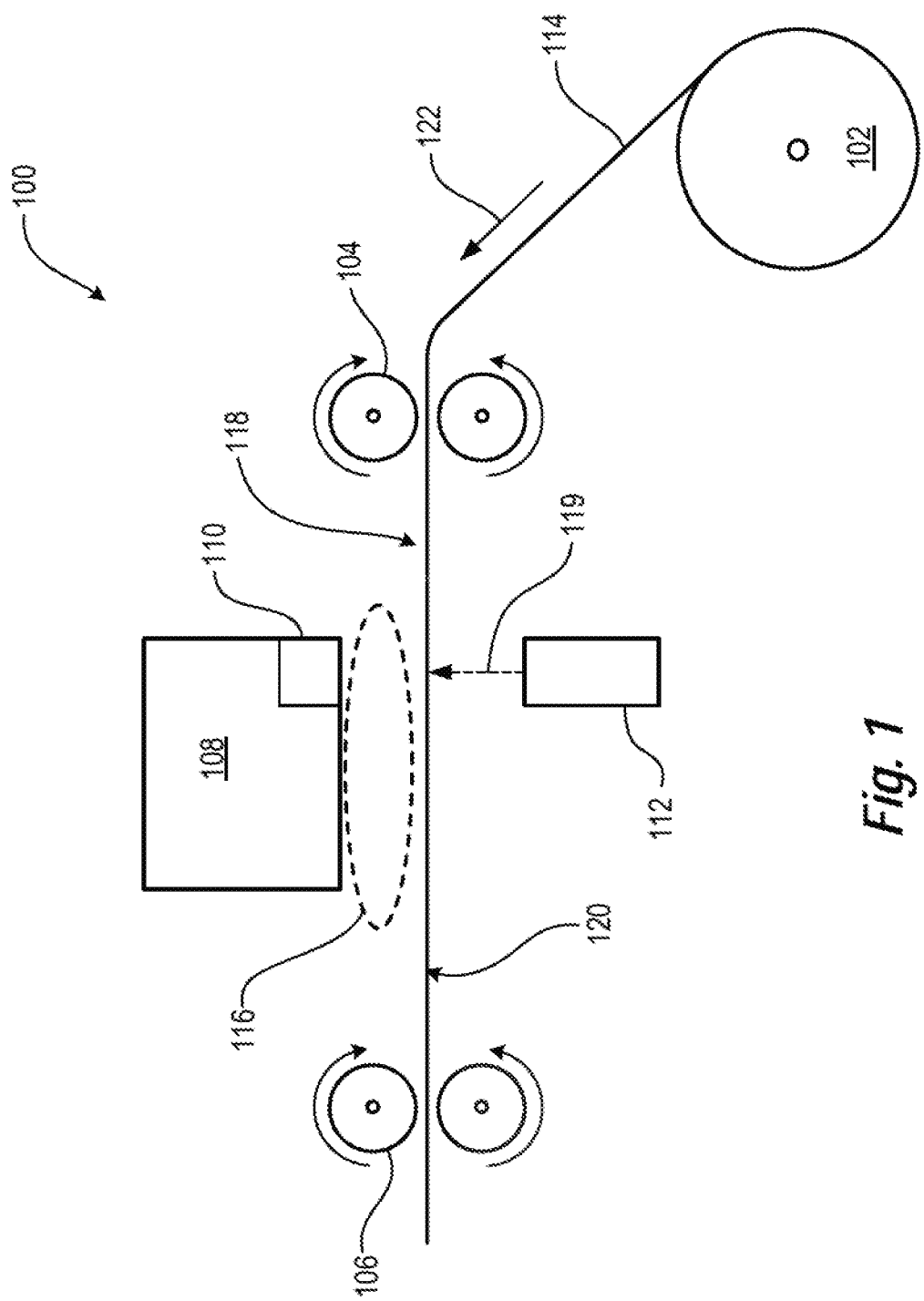
FIG. 1 is a side view of an example printer 100.

FIG. 1 is a side view of an example printer 100. Printer 100 comprises a media source 102, a pair of pinch rollers 104, a pair of take-up rollers 106, a print engine 108, a sensor 110, a light source 112 and media 114. A media path runs from the media source 102, between the pair of pinch rollers 104, underneath the print engine 108 and between the pair of take-up rollers 106. Media 114 is shown in the media path. During printing the media 114 travels along its length in a printing direction as shown by arrow 122. A print zone 116 is underneath the print engine 108. The print zone is defined as the location where printing fluid from the print engine is deposited onto the media 114. Printing fluid is any liquid that is deposited by the print engine and can comprise black ink, colored inks, gloss, pre-treatment fluids, finishing fluids and the like.

In this example, sensor 110 is located on the print engine 110. In other examples the sensor may be located in a different position, for example adjacent to the print engine. Sensor 110 can be any type of sensor that detects light intensity, for example a charged coupled device (COD). Media 114 has a first side 118 and a second side 120. The first side 118 of the media is facing the print engine 108. Sensor is located above the first side 118 of the media 114.

Light source 112 is located below the sensor 110 facing the second side 120 of the media 114 such that the media path travels between the sensor 110 and the light source 112. Light 119 from the light source is directed towards the sensor. Light 119 from the light source 112 travels through the media 114 towards the sensor 110. Because the light travels through the media 114 the light 119 backlights the media such that the sensor can detect images and/or targets printed on the second side 120 of the media.

In one example, media 114 is "day and night" (D&N) media. D&N media may also be known as banner media. D&N media is typically between 50% and 95% opaque, for example 90% opaque. D&N media typically comes in a roll or web containing 50 meters or more of material, but may also come as sheets of media. D&N media is typically fabricated from PVC, but may be fabricated from other materials. D&N media may typically be between 0.5 mm and 2.0 mm thick, for example 1.0 mm thick.

Figure 2:
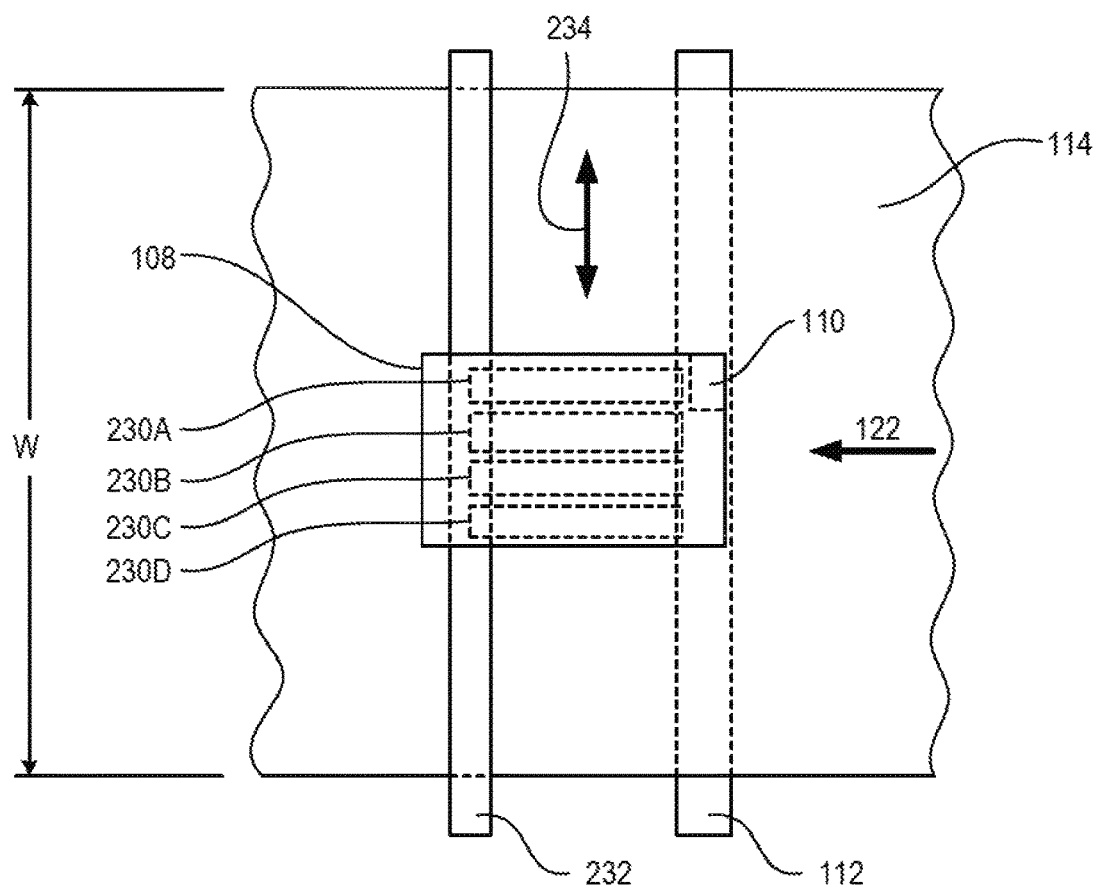
FIG. 2 is a sectional top view of the example printer 100.

FIG. 2 is a sectional top view of the example printer 100. In this example print engine 108 is configured as a carriage mounted on guide rail 232. The carriage travels back and forth across the width W of the media 114 as shown by arrow 234. In some examples the width of the media may be between 60 and 180 inches wide (1524 to 4572 mm wide), for example 130 inches (3,302 mm) wide. In other examples the width of the media may be smaller or larger. The print engine 108 may also comprise motors, drive belts or gears, additional guide rails, linear position sensors and the like, but these items are not shown for clarity.

Printheads (230 A-D) mounted in the carriage deposit printing fluids onto the first side 118 (see FIG. 1) of media 114 as the carriage travels across the width of the media 114. In this example 4 printheads (230 A-D) are shown mounted in the carriage. Printheads (230 A-D) are removably mounted in the print engine and are typically user loadable/replaceable. Each printhead may deposit a different printing fluid, for example the printheads (230 A-D) may deposit black ink, cyan ink, yellow ink and magenta ink, respectively. In other examples there may be more or fewer printheads mounted in the carriage. When printing an image the media 114 is advanced in the printing direction 122 after each swath of the image is printed.

Sensor 110 is mounted in the carriage and sweeps back and forth across the media with the carriage. Light source 112 is positioned underneath the path the sensor makes as it travels back and forth across the media. The media 114 travels between the sensor 110 and the light source 112 thereby allowing the light source to backlight the media. In some examples the sensor 110 can be used when the printheads are depositing printing fluids onto the media 114 and when the carriage is sweeping across the media when the printheads are not depositing printing fluids onto the media 114. By sweeping the carriage across the full width of the media and incrementally advancing the media 114 in the printing direction, the sensor can scan all areas of the media.

Figure 3:
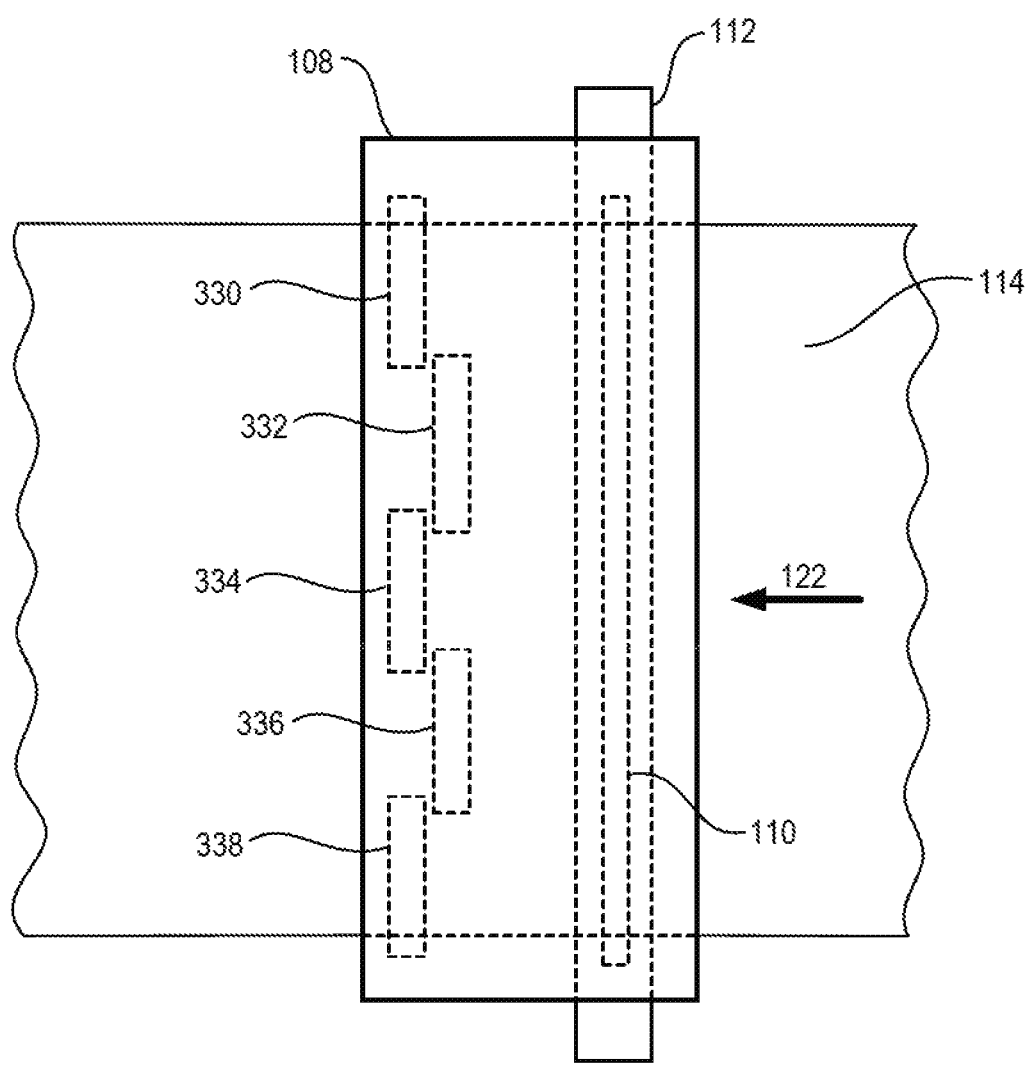
FIG. 3 is a sectional top view of another example printer.

FIG. 3 is a sectional top view of another example printer. In this example print engine 108 is configured as a page wide array (PWA) of printheads. The printheads (330-338) are arranged in a staggered line that stretches across the width of the media 114. In other examples a single wide printhead may stretch across the full width of the media. When printing the print engine remains stationary as the media moves underneath the print engine in the printing direction 122. In this example there are 5 printheads that are mounted in the print engine and stretch across the width of the media. In other examples there may be more or fewer printheads. Each printhead may deposit multiple types of printing fluid as the media moves underneath the print engine. For example, each printhead may deposit black ink, cyan ink, yellow ink and magenta ink. In other examples additional printing fluids may be deposited by each printhead.

In the present example, sensor 110 is a line sensor, for example a line of CODs that stretch across the width of the media 114. As the media moves in the printing direction 122 the sensor can scan the full width of the media 114. Light source 112 is positioned underneath sensor 110. The media 114 travels between the sensor 110 and the light source 112 thereby allowing the light source to backlight the media 114.

In operation, printer 100 prints an image and at least one target on one side of the media and then prints a mirrored copy of the image on the other side of the media after the media is flipped over. In this application the side of the media that gets printed on first will be called side A. The side that gets printed on second, after the media if flipped over, will be known as side B. In some examples, the media is in a continuous roll. The roll of media is flipped over after the image is printed on side A such that the image can be printed on side B. In other examples, the media may start as sheets of media, or may be cut into sheets after printing on side A. After printing on side A, the sheets of media would be flipped over such that the image can be printed onto side B.

Printer 100 prints an image and one or more targets onto side A of the media. The media is flipped over such that side B of the media is now facing the print engine. As the flipped media is advanced into the print zone the printer turns on the light source 112 backlighting the media. The sensor is used to scan and locate any targets on side A through the media. A mirrored copy of the image printed on side A of the media is printed onto side B of the media that is now facing the print engine. The mirrored copy of the image printed on side B is aligned to the image printed on the side A using the location of the targets printed on side A of the media.

FIG. 4A is an example of the printing on side A. The printing on side A comprises an image 440 and one or more targets 442 printed on both sides of the image 440. In this example the targets 442 are printed in a row down both sides of the image 440. In other examples fewer targets may be used, for example only one target 442 printed on one side of the image 440. In this example the targets are shaped like the letter 'N'. In other examples other shapes may be used. The position of the targets relative to the position of the image is known. Therefore when the location of a target is determined, the location of the image is known.

Scanning the target with a scan line creates peaks and valleys of light density. The peaks and valleys depend on where the scan line intersects the target. FIG. 4B is an example target being scanned. Target 442 is shaped like the letter 'N'. Scan line 550 is shown passing through the middle of target 442 without any skew. Line 552 is a plot of the optical intensity from scan line 550. The distance d1 is the distance between the two outer peaks. When the scan line passes through the target with no skew distance d1 is equal to the actual width W of target 442. Distance d2 is the distance between the middle peak and one of the outer peaks. In this example distance d2 is equal to ½ distance d1, indicating that scan line 550 is exactly between the top and bottom of target 442.

FIG. 4C is an example target being scanned. Scan line 550 is shown passing through the top of target 442 without any skew. Line 552 is a plot of the optical intensity from scan line 550. The distance d1 is the distance between the two outer peaks. When the scan line passes through the target with no skew distance d1 is equal to the actual width W of target 442. Distance d2 is the distance between the middle peak and one of the outer peaks. In this example distance d2 is greater than ½ distance d1, indicating that scan line 550 is near the top of target 442.

FIG. 4D is an example target being scanned. Scan line 550 is shown passing through the top of target 442 with some skew. Line 552 is a plot of the optical intensity from scan line 550. The distance d1 is the distance between the two outer peaks. When the scan line passes through the target with skew, distance d1 is greater than the actual width W of target 442. The difference between distance d1 and the actual width W can be used to determine the amount of skew.

In one example the sensor will scan with a resolution of 600 samples per inch. In other examples the resolution may be higher or lower. When the print engine is configured as a carriage (as shown in FIG. 2) the sampling rate for the sensor is dependent on the speed of the carriage. When the maximum carriage speed is 60 inches per second, the desired resolution of 600 samples per inch results in a sampling rate for the sensor of 36 KHz. When the print engine is configured as a PWA, the line scanner will have a pixel spacing that matches the desired resolution.

Figure 5:
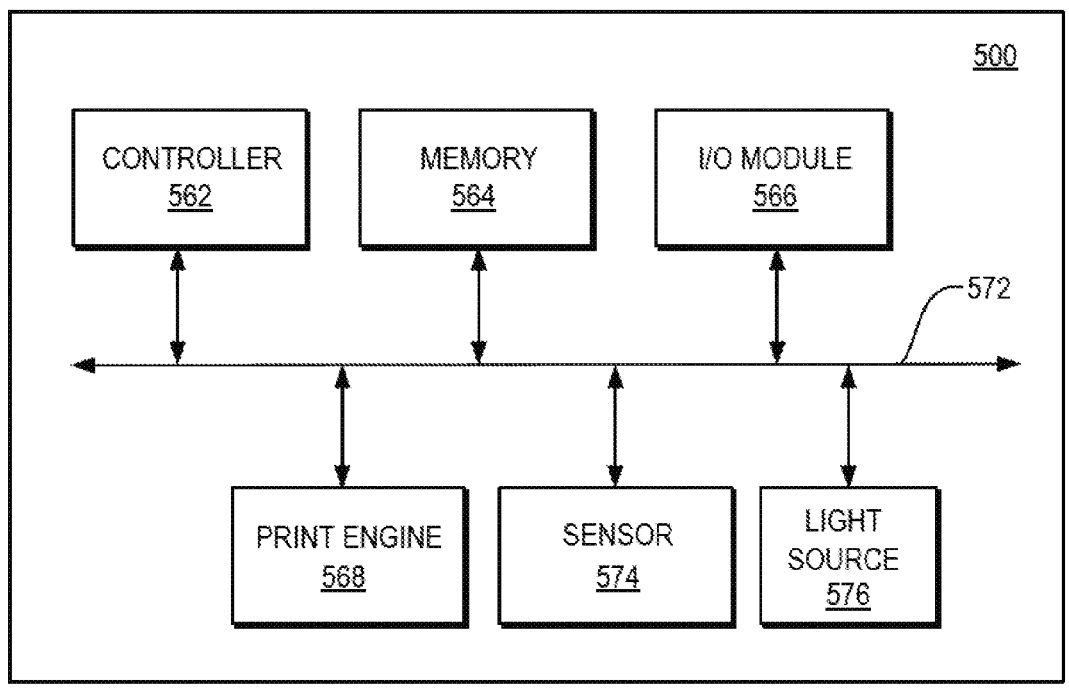
FIG. 5 is an electrical block diagram of an example printer 500.

FIG. 5 is an electrical block diagram of an example printer 500. Printer comprises a controller 562, memory 564, input/output (I/O) module 566, print engine 568, sensor 574 and a light source 576 all coupled together on bus 572. In some examples printer may also have a user interface module, an input device, and the like, but these items are not shown for clarity. Controller 562 comprises at least one processor. The processor may comprise a central processing unit (CPU), a micro-processor, an application specific integrated circuit (ASIC), or a combination of these devices. Memory 564 may comprise volatile memory, non-volatile memory, and a storage device. Memory 564 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 566 is used to couple printer to other devices, for example the Internet or a computer. Printer has computer executable code, typically called firmware, stored in the memory 564. The firmware is stored as computer readable instructions in the non-transitory computer readable medium (i.e. the memory 564) The processor generally retrieves and executes the instructions stored in the non-transitory computer-readable medium to operate the printer and to execute functions. In one example, processor executes code that aligns and prints images onto a second side of media.

Figure 6:
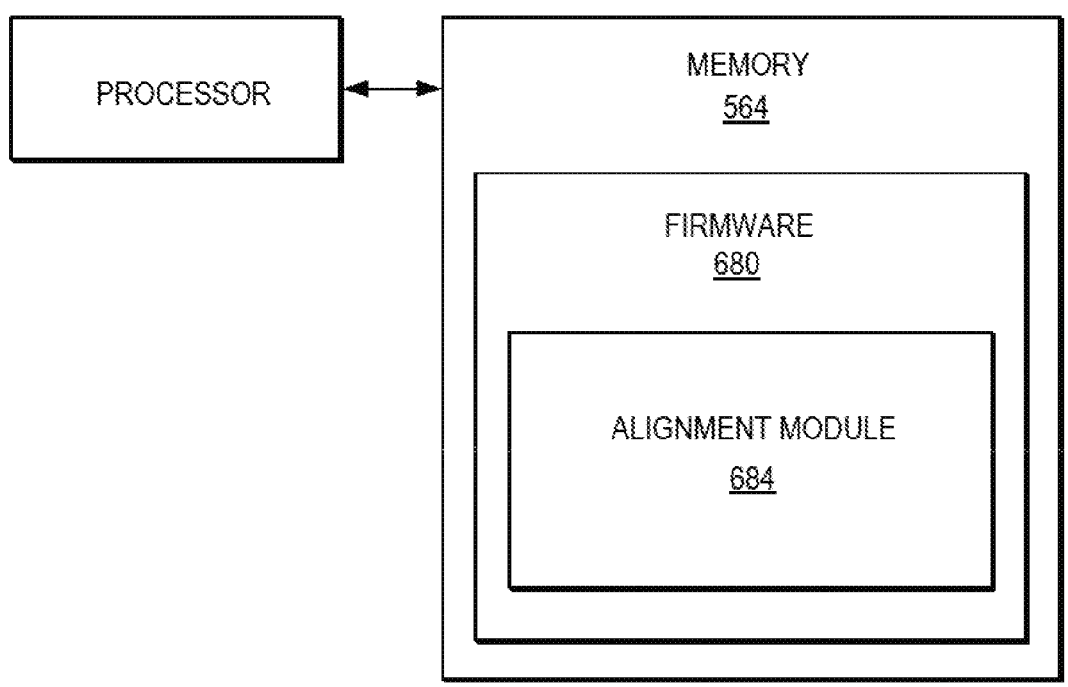
FIG. 6 is an example block diagram of the processor coupled to memory 564.

FIG. 6 is an example block diagram of the processor coupled to memory 564. Memory 564 contains firmware 680. Firmware 680 contains an alignment module 684. The processor executes the code in the alignment module 684 to print an image on the second side of D&N media. The alignment module may use the method shown in FIG. 7 to print an image on the second side of D&N media.

Figure 7:
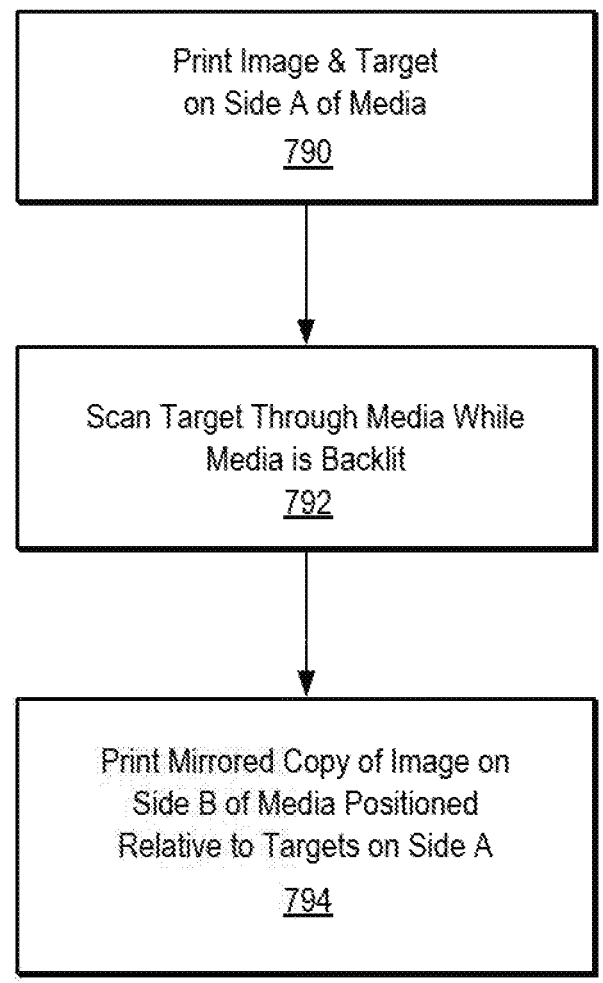
FIG. 7 is an example flow chart for a method of printing.

FIG. 7 is an example flow chart for a method of printing. At 790 an image and at least one target is printed on side A of media. At 792 the position of the at least one target is located using a sensor that looks through the media while the media is backlit. At 794 a mirrored copy of the image is printed on side B where the mirrored copy is positioned relative to the at least one target on side A of the media.

What is claimed is:

1. A printer comprising:
a print engine;
a controller to control the print engine to form an image on a medium in a print zone of a media path that extends through the printer and includes the print zone;
a sensor located on a first side of the media path;
a light source located on a second side of the media path arranged to direct light to the sensor across the media path;
the controller to determine a location on a medium in the print zone of a printed target that is printed on a side of the medium that is adjacent to the light source, the controller determining the location on the medium of the printed target based on output from the sensor which senses the printed target through the medium using light from the light source which has passed through the medium.

2. The printer of claim 1, the controller to determine a location to print an image on a side of the medium adjacent the print engine based on the location of the printed target identified on an opposite side of the medium using the sensor and light source.

3. The printer of claim 2, wherein, under control of the controller, the image is a mirror image of a previous image already printed on the opposite side of the medium with the target.

4. The printer of claim 3, the controller to determine locations for printed targets printed on both sides of the previous image.

5. The printer of claim 1, wherein the print engine and sensor are disposed on a moveable carriage so as to be scanned across a width of the print zone transverse to the media path.

6. The printer of claim 1, wherein the print engine comprises a page-width array of printheads and the sensor comprises a line sensor, and the sensor and light source both extend across a width of the print zone.

7. The printer of claim 1, wherein, when the printed target is shaped as an "N," the controller to track movement of an absorption peak caused by the central slanted line of the "N" as movement of the medium passes the printed target between the sensor and light source.

8. The printer of claim 1, the sensor to scan with a resolution of 600 samples per inch of the medium.

9. A method, comprising:
back-lighting a medium with a light source disposed on a back side of the medium;
sensing light from the light source that has passed through the medium with a sensor located on a front side of the medium;
advancing the medium along a media path between the light source and sensor; and
identifying a location, on the back side of the medium, of a printed target printed on the back side of the medium, wherein the location is identified based on interference by the printed target of light from the light source as determined from output of the sensor.

10. The method of claim 9, further comprising determining a location at which to print an image on the front side of the medium based on the location of the printed target on the back side of the medium.

11. The method of claim 10, further comprising printing the image at the location on the front side of the medium that was determined based on the location of the printed target on the back side of the medium.

12. The method of claim 11, wherein the image is a mirrored copy of a previous image already printed on the back side of the medium along with the printed target.

13. The method of claim 12, further comprising printing the mirrored copy with a lower saturation than the previous image.

14. The method of claim 12, wherein the printed target comprises shapes printed on both sides of the previous image on the back side of the medium.

15. The method of claim 9, wherein the printed target comprises a mark that is shaped as an "N."

16. The method of claim 15, further comprising tracking movement of an absorption peak caused by the central slanted line of the "N" as movement of the medium passes the printed target between the sensor and light source.

17. The method of claim 15, wherein the printed target comprises a row of marks, each mark shaped as an "N," disposed before and after the previous image along a direction the medium moves in the media path.

18. The method of claim 9, wherein the media is between 50% and 95% opaque.

19. The method of claim 9, further comprising the sensor detecting light from the light source with a resolution of at least 600 samples per inch of the medium.

20. The method of claim 9, further comprising printing a day-and-night sign by:
printing an image at a location on the front side of the medium determined based on the location of the printed target on the back side of the medium, the image being a mirrored copy of a previous image already printed on the back side of the medium along with the printed target; and removing a portion of the medium comprising the printed target.

* * * * *

UNITED STATES PATENT AND TRADEMARK OFFICE
CERTIFICATE OF CORRECTION

PATENT NO.        : 10,035,363 B2
APPLICATION NO.   : 15/630663
DATED             : July 31, 2018
INVENTOR(S)       : Jordi Hernandez Creus et al.

Page 1 of 1

It is certified that error appears in the above-identified patent and that said Letters Patent is hereby corrected as shown below:

On the Title Page

In Column 1, Item (71), Applicant, Line 2, after "COMPANY," insert -- L.P., --.

Signed and Sealed this
Eleventh Day of December, 2018

Andrei Iancu
*Director of the United States Patent and Trademark Office*